United States Patent
Burger et al.

(10) Patent No.: US 6,230,248 B1
(45) Date of Patent: May 8, 2001

(54) METHOD AND APPARATUS FOR PRE-VALIDATING REGIONS IN A VIRTUAL ADDRESSING SCHEME

(75) Inventors: Stephen G. Burger, Santa Clara; James O. Hays, San Jose; Jonathan K. Ross, Sunnyvale; William R. Bryg, Saratoga; Rajiv Gupta, Los Altos; Gary N. Hammon, Campbell; Koichi Yamada, San Jose, all of CA (US)

(73) Assignee: Institute for the Development of Emerging Architectures, L.L.C., Cupertino, CA (US)

( * ) Notice: Subject to any disclaimer, the term of this patent is extended or adjusted under 35 U.S.C. 154(b) by 0 days.

(21) Appl. No.: 09/170,140

(22) Filed: Oct. 12, 1998

(51) Int. Cl.$^7$ .................................................. G06F 12/16

(52) U.S. Cl. ............................ 711/207; 711/156; 711/209

(58) Field of Search .................................. 711/156, 203, 711/205, 206, 207, 208, 209

(56) References Cited

U.S. PATENT DOCUMENTS

| | | | |
|---|---|---|---|
| 5,923,864 | * 7/1999 | Inoue | 711/207 |
| 5,940,872 | * 8/1999 | Hammond et al. | 711/207 |
| 6,044,447 | * 3/2000 | Averill et al. | 711/207 |
| 6,047,362 | * 4/2000 | Zucker | 711/203 |
| 6,065,091 | * 5/2000 | Green | 711/3 |

\* cited by examiner

Primary Examiner—Matthew Kim
Assistant Examiner—Christian P. Chace
(74) Attorney, Agent, or Firm—David A. Plettner

(57) ABSTRACT

A method and apparatus pre-validate regions in a virtual addressing scheme by storing both the virtual region number (VRN) bits and region identifiers (RIDs) in translation lookaside buffer (TLB) entries. By storing both the VRN bits and RIDs in TLB entries, the region registers can be bypassed when performing most TLB accesses, thereby removing region registers the critical path of the TLB look-up process and enhancing system performance. A TLB in accordance with the present invention includes entries having a valid field, a region pre-validation valid (rpV) field, a virtual region number (VRN) field, a virtual page number (VPN) field, a region identifier (RID) field, a protection and access attributes field, and a physical page number (PPN) field. In addition, a set of region registers contains the RIDs that are active at any given time. When a virtual-to-physical entry is established for a page in a region having an RID stored in a region register, the RID and VRN are stored in the appropriate fields of the TLB entry. In addition, the valid field is set and the rpV field is set to indicate that the TLB entry contains an active VRN-to-RID mapping, thereby pre-validating the region. When a physical address is translated into a virtual address, a VRN and a VPN are extracted from the virtual address and provided to the TLB. The TLB is searched to find an entry having a set valid field, a set rpV field, and VRN and VPN fields containing entries matching the VRN and VPN extracted from the virtual address. If such an entry is found, the protection and access attributes field is used to determine whether the requested access is allowed. If the requested access is allowed, the PPN from the PPN field of the TLB entry is combined with an offset from the virtual address to produce a physical address that is used to complete the memory access.

1 Claim, 3 Drawing Sheets

METHOD AND APPARATUS FOR PRE-VALIDATING REGIONS IN A VIRTUAL ADDRESSING SCHEME

FIELD OF THE INVENTION

The present invention relates to memory organization in computer systems. More specifically, the present invention relates to virtual memory systems that supports regions, and the process by which virtual addresses are translated to physical addresses.

DESCRIPTION OF THE RELATED ART

Many prior art computer systems use a technique called virtual memory, which simulates more logical memory than physical memory actually present and allows the computer to run several programs concurrently, regardless of their size. Concurrent user programs access main memory physical addresses via virtual addresses assigned by the operating system. The mapping of the virtual addresses to the main memory physical addresses is a process known as virtual address translation. Virtual address translation can be accomplished by any number of techniques, thereby allowing the processor to access the desired information in main memory.

The virtual address and physical address spaces are typically divided into equal size blocks of memory called pages, and a page table provides the translation between virtual addresses and physical addresses. Each page table entry typically contains the virtual address and/or the physical address, and protection and status information concerning the page. Status information typically includes information about the type of accesses the page has undergone. For example, a dirty bit indicates there has been a modification to data in the page. Because the page tables are usually large, they are stored in memory. Therefore each regular memory access can actually require at least two accesses, one to obtain the translation and a second to access the physical memory location.

Many computer systems that support virtual address translation use a translation lookaside buffer (TLB). The TLB is typically a small, fast, associative memory which is usually situated on or in close proximity to the processor unit and stores recently used pairs of virtual and physical addresses. The TLB contains a subset of the translations in the page table and can be accessed much more quickly. When the processing unit needs information from main memory, it sends the virtual address to the TLB. The TLB accepts the virtual address page number and returns a physical page number. The physical page number is combined with low order address information to access the desired byte or word in main memory.

In most cases the TLB cannot contain the entire page table. Accordingly, when a virtual page is accessed and the translation is not in the TLB, the page table is accessed to determine the translation of the virtual page number to a physical page number, and this information is entered in the TLB. Access to the page table can take twenty times longer than access to the TLB, and therefore program execution speed is optimized by keeping the translations being utilized in the TLB.

Some computers expand the virtual addressing concept by supporting regions. Regions provide the capability to effectively create independent local, shared and global address spaces within the virtual address space by dividing the virtual address space into equally sized regions. Typically, only a subset of regions can be active at any time. Associated with each region is a region identifier, which uniquely tags address translations of given regions. If the region identifier for a region is assigned to a particular process, this region space becomes local to that process. If the region identifier for a region is shared among processes, this region space becomes shared. If the region identifier for a region is shared by all processes, this region becomes global. Changing the region identifiers for the local regions effectively swaps virtual addresses from the local space of one process to the local space on another process. Thus, regions virtually eliminate the need to flush the TLB when switching process, thereby improving overall system performance.

Regions are typically supported in the TLB by region registers that map virtual region number bits (which are part of the virtual address) to region identifiers. The region registers require an additional look-up step to be performed before determining whether the translation for a virtual address is in the TLB. This additional look-up step sometimes becomes a critical path in the virtual-to-physical translation process. Accordingly, performance would be enhanced if this additional look-up step could be eliminated.

SUMMARY OF THE INVENTION

The present invention is a method and apparatus for pre-validating regions in a virtual addressing scheme. In accordance with the present invention, regions are pre-validated by storing both the virtual region identifier bits and region identifiers in translation lookaside buffer (TLB) entries. By storing both the virtual region identifier bits and region identifiers in TLB entries, the region registers can be bypassed when performing most TLB accesses. Accordingly, the region registers are removed from the critical path of the TLB look-up process and system performance is enhanced.

A TLB in accordance with the present invention includes entries having a valid field, a region pre-validation valid (rpV) field, a virtual region number (VRN) field, a virtual page number (VPN) field, a region identifier (RID) field, a protection and access attributes field, and a physical page number (PPN) field. In addition, a set of region registers contains the RIDs that are active at any given time. However, the region registers are not in the path of the TLB look-up process.

When a virtual-to-physical entry is established for a page in a region having an RID stored in a region register, the RID and VRN are stored in the appropriate fields of the TLB entry. In addition, the valid field is set and the rpV field is set to indicate that the TLB entry contains an active VRN-to-RID mapping, thereby pre-validating the region.

When a CPU in accordance with the present invention translates a physical address to a virtual address, a VRN and a VPN are extracted from the virtual address and provided to the TLB. The TLB is searched to find an entry having a set valid field, a set rpV field, and VRN and VPN fields containing entries matching the VRN and VPN extracted from the virtual address. If such an entry is found, the protection and access attributes field is used to determine whether the requested access should be allowed. If the requested access is allowed, the PPN from the PPN field of the TLB entry is combined with an offset from the virtual address to produce a physical address that is used to complete the memory access. Since the path through the region registers has been eliminated because the contents of the region registers have been "pre-validated" in the entries of the TLB, the speed of the virtual-to-physical look-up process is increased.

DETAILED DESCRIPTION OF THE PREFERRED EMBODIMENTS

The present invention is a method and apparatus for pre-validating regions in a virtual addressing scheme. In essence, regions are pre-validated by storing both the virtual region number (VRN) bits and region identifier (RID) in a translation lookaside buffer (TLB) entry. By storing both the VRN and RID in a TLB entry, the region registers can be bypassed when performing most TLB accesses. Accordingly, the region registers are removed from the critical path of the TLB look-up process and system performance is enhanced.

Figure 1:
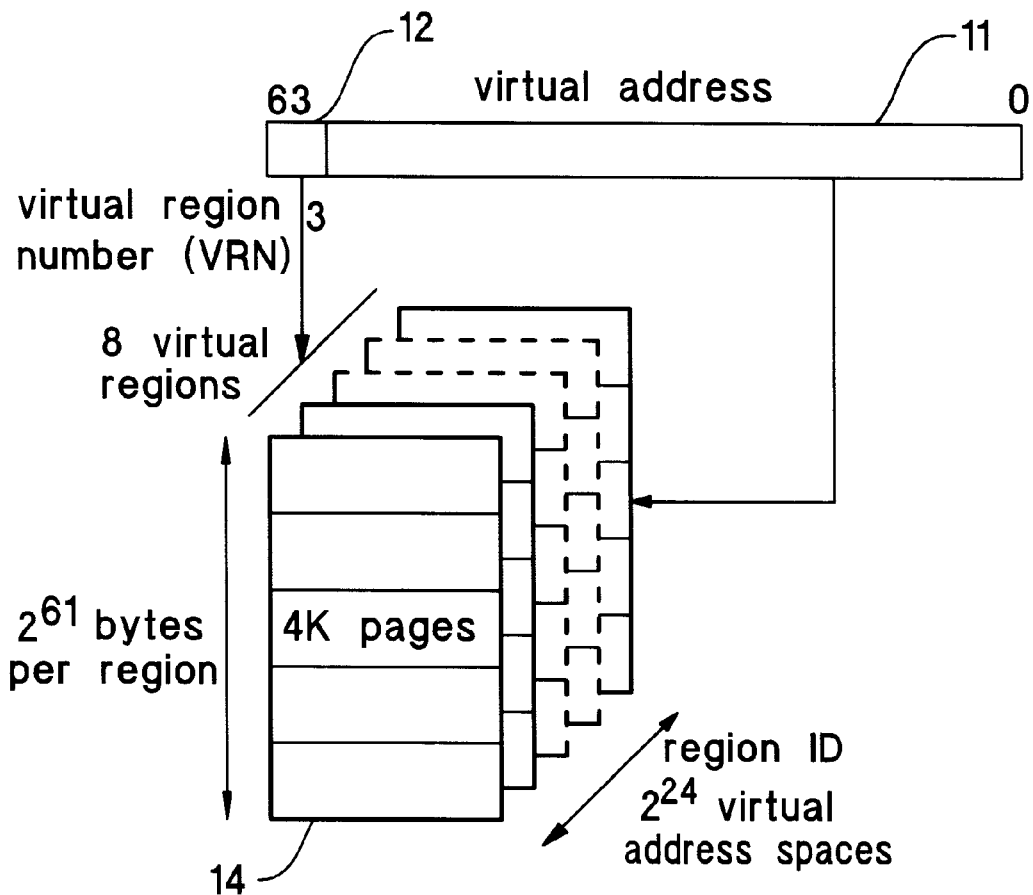
FIG. 1 shows a 64-bit virtual addressing scheme that supports $2^{24}$ virtual regions with each region having $2^{61}$ bytes, with eight of the regions active at any given time.

Before discussing the invention in greater detail, first consider the virtual addressing scheme 10 shown in FIG. 1. Virtual address 11 is a 64-bit address. The upper three bits form a virtual region number (VRN) 12. Accordingly, eight regions can be specified by a virtual address at any given time. The remaining 61 bits of virtual address 11 are used to address memory within each region, thereby providing each region with $2^{61}$ bytes of virtual memory. Associated with each memory page (such as page 14) is a 24-bit region identifier (RID). Therefore, the operating system can assign up to $2^{24}$ individual virtual address spaces.

Figure 2:
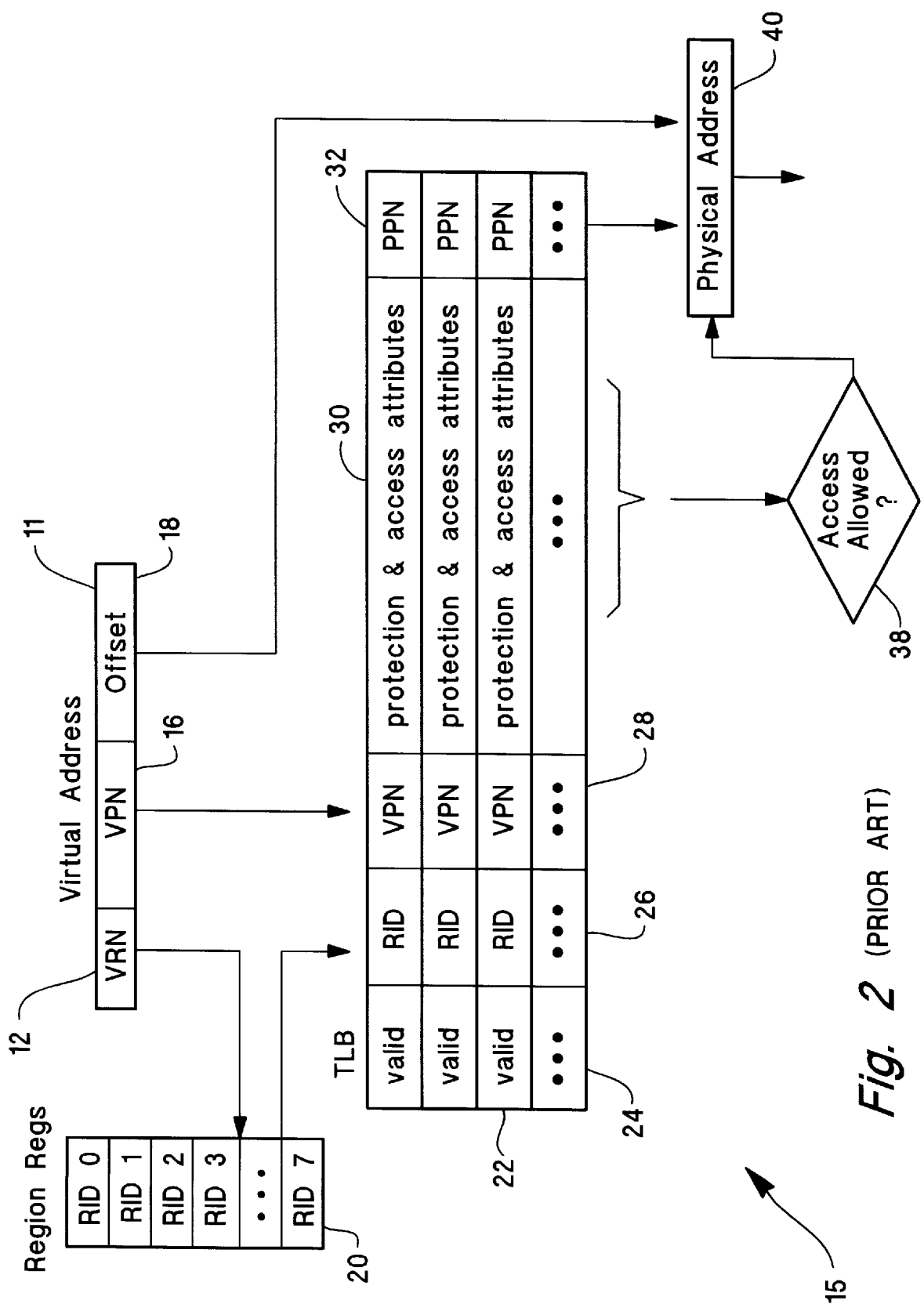
FIG. 2 shows a prior art virtual-to-physical translation scheme used in prior art CPUs.

FIG. 2 shows a prior art virtual-to-physical translation scheme 15 used in prior art CPUs. In a prior art CPU using scheme 15, when the CPU translates a virtual address to a physical address, the three bits of VRN 12 are used to select one of the eight region registers 20. The RID contained within the selected region register is provided to TLB 22.

The remaining 61 bits of virtual address 11 are divided between virtual page number (VPN) 16 and offset 18. Offset 18 simply represents the bytes within a page. Therefore, if the page size is 4 kilobytes, the offset will be 12 bits and the VPN will be 41 bits. If the page size is 64 kilobytes, the offset will be 16 bits and the VPN will be 45 bits.

Each entry of TLB 22 includes valid field 24, RID field 26, protection and access attributes field 30, and physical page number (PPN) field 32. Valid field 24 simply indicates whether the entry is valid, and therefore is in use. If valid field 24 is cleared to indicate that the entry is not in use, then the entry is available to receive a new translation.

RID field 26 stores the RID associated with the virtual page. VPN field 28 stores the virtual page associated with the virtual-to-physical translation. Protection and access attributes field 30 contains protection and access information, including a "dirty" bit, cache policy, whether read, write, and execute privileges have been granted, and similar protection and access information known in the art. Finally, each entry of TLB 22 includes a physical page number (PPN) field 32, which in combination with VPN field 28 represents the virtual-to-physical translation.

As discussed above, the RID from the selected register of region registers 20 is provided to TLB 22. In addition, VPN 16 is provided to TLB 22. Entries of TLB 22 having valid field 24 set to indicate a valid TLB entry are then searched. If any of the searched entries produce a match between the RID provided by the selected register of region registers 20 and the contents of RID field 26, and also produce a match between VPN 16 from virtual address 11 and the contents of VPN field 28, then a matching TLB entry has been found. The protection and access information from protection and access attributes 30 of the matching entry is provided to decision block 38. Decision block 38 determines whether the requested access is allowed. If it is, the PPN from PPN field 32 of the matching entry is combined with offset 18 of virtual address 11 to produce a physical address at physical address block 40. The physical address provided by block 40 is then used to complete the memory access.

Note that in prior-art virtual-to-physical translation scheme 15, when a TLB entry is to be purged from TLB 22, TLB 22 is searched to find an entry having valid field 24 set, and a RID field 26 and a VPN field 28 having entries that match the virtual-to-physical translation to be purged. If such an entry is found, valid field 24 of that entry is cleared. Also note that the path from virtual address 11 through region registers 20 to TLB 22 is longer than the path from virtual address 11 to TLB 22. In many CPUs, the path through the region registers is a critical path, thereby limiting system performance.

Figure 3:
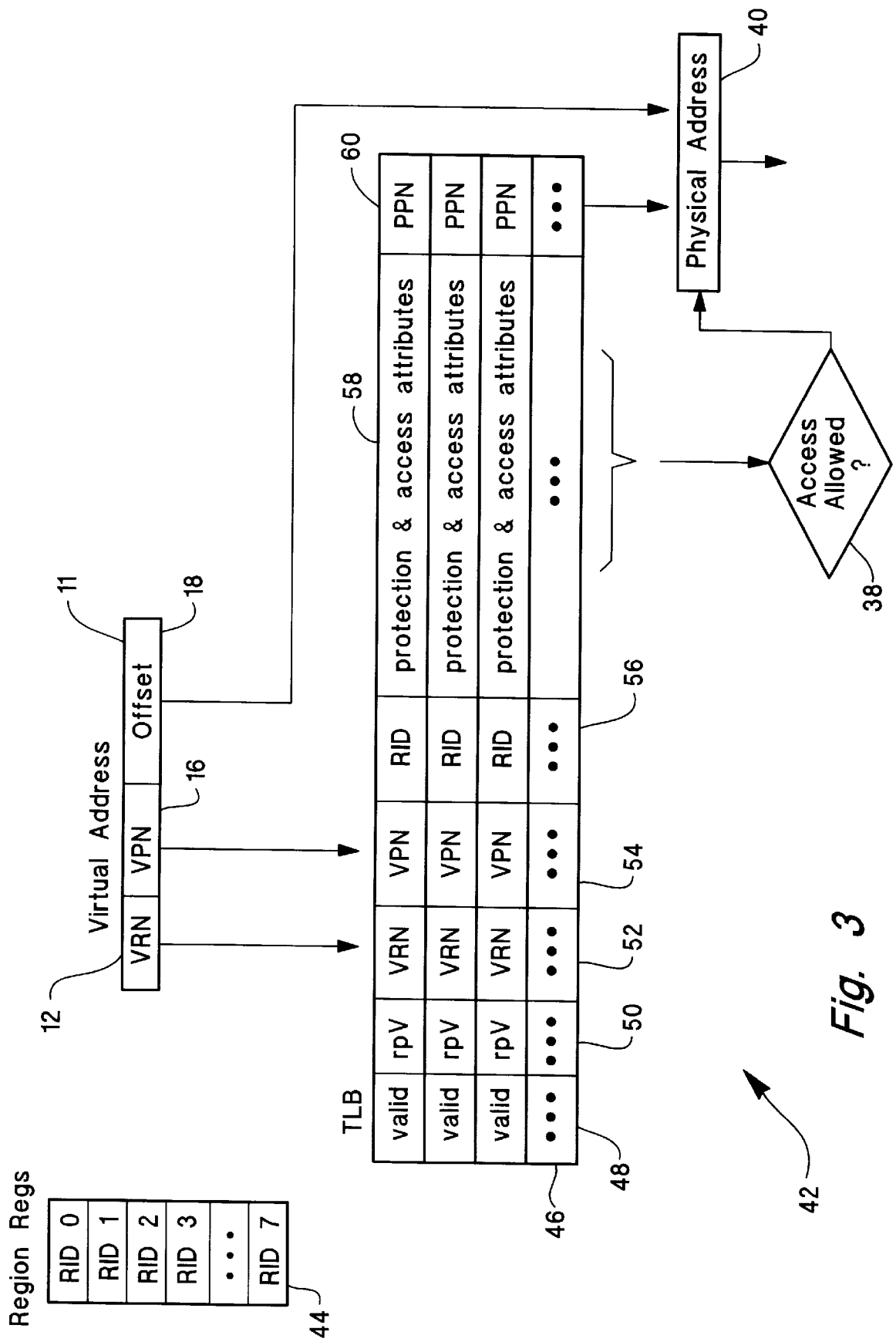
FIG. 3 shows a virtual-to-physical translation scheme in accordance with the present invention.

FIG. 3 shows a virtual-to-physical translation scheme 42 in accordance with the present invention. In virtual-to-physical translation scheme 42, TLB searches are performed more quickly because the critical path through the region registers has been eliminated.

In FIG. 3, TLB 46 includes valid field 48, region pre-validation valid (rpV) field 50, VRN field 52, VPN field 54, RID field 56, protection and access attributes field 58, and PPN field 60. Region registers 44 contain the regions that are valid at any given time. However, region register 44 is not in the path of the TLB look-up process. Similar to valid field 24 of TLB 22 in FIG. 2, valid field 48 indicates whether the entry is valid, and therefore is in use. If valid field 48 is cleared to indicate that the entry is not in use, than the entry is available to receive a new translation. In addition, the functionality provided by VPN field 54, protection and access attributes field 58, and PPN field 60 is similar to the functionality provided by VPN field 28, protection and access attributes field 30, and PPN field 32, respectively, of TLB 22 of FIG. 1.

In contrast, the functionality provided by rpV field 50, VRN field 52, and RID field 56 is different. When a virtual-to-physical entry is established for a page in a region having a RID stored in one of the region registers 44, the RID stored in the region register indexed by VRN 12 is stored in RID field 56, and VRN 12 itself is stored in VRN field 52. Furthermore, rpV field 50 is set to indicate that the TLB entry contains a VRN-to-RID mapping that is currently active in region registers 44, thereby pre-validating the region. In addition, valid field 48 is set, VPN 16 is stored in VPN field 54, protection and access information is stored in protection and access attributes field 58, and the physical page number is stored in PPN field 60.

When a CPU in accordance with the present invention translates a physical address to a virtual address, VRN 12 and VPN 16 are provided directly to TLB 46. TLB 46 is searched to find an entry having valid field 48 set, rpV field 50 set, a VRN entry in VRN field 52 that matches VRN 12, and a VPN entry in VPN field 54 that matches VPN 16. Note that RID field 56 is not searched. If such an entry is found, the protection and access information from protection and access attributes 58 of the entry is provided to decision block 38. Decision block 38 determines whether the requested access is allowed. If it is, the PPN from PPN field 60 of the entry is combined with offset 18 of virtual address 11 to produce a physical address at physical address block 40. The physical address provided by block 40 is then used to complete the memory access. Note that the path through the region registers has been eliminated because the contents of the region registers have been "pre-validated" in the entries of TLB 46.

Similar to prior-art virtual-to-physical translation scheme 15, when a TLB entry is to be purged from the TLB 46, TLB 46 is searched to find an entry having valid field 48 set, and a RID field 56 and a VPN field 54 having entries that match the virtual-to-physical translation to be purged. If such an entry is found, valid field 46 of that entry is cleared.

While the present invention eliminates the path through the region registers during the translation look-up process, there is a minor performance penalty incurred when writing to the region registers. With reference to prior-art virtual-to-physical translation scheme 15 of FIG. 2, when it is desired to insert a different RID into one of the region registers 20, the RID is simply inserted into the appropriate region register. Entries in TLB 22 matching the RID displaced from the region register can no longer be accessed because the look-up path goes through region registers 20, and the displaced RID is no longer present. If the displaced RID is later restored to the region register, it is simply reinserted and the TLB entry will again be accessed.

In contrast, the look-up path does not go through region registers 44 in FIG. 3. Therefore, when it is desired to insert a new RID into one of the region registers 44, TLB 46 must be searched to find all entries having a valid field 48 set and a VRN contained in VRN field 52 that corresponds with the region register receiving the new RID. Next the RID fields 56 of all entries in TLB 46 that match the VRN are compared to the new RID. If the RIDs match, rpV field 50 is set to pre-validate the region. If the RIDs do not match, rpV field 50 is cleared to de-validate the region. While changing active regions is somewhat slower in virtual-to-physical translation scheme 42 of the present invention compared to prior-art virtual-to-physical translation scheme 15, overall performance is greatly improved by removing the region registers from the look-up paths because virtual-to-physical translations occur much more frequently than updates to the region registers.

It is known in the art to use content addressable memories (CAMs) to implement the fields that are searched. For example, CAMs may be used to implement RID fields 26 and VPN fields 28 of TLB 22 in FIG. 2, and VRN fields 52, VPN fields 54, and RID fields 56 of TLB 46 in FIG. 3. Typically fields that are searched more frequently are implemented using fast CAMs, while fields that are searched less frequently are implemented using slow CAMs. Fast CAMs tend to require more circuitry than slow CAMs, and thereby consume more transistors on the integrated circuit containing the TLB. One advantage provided by the present invention is that the number of fast CAMs can be reduced. In FIG. 2, RID fields 26 are part of the critical translation look-up path. Accordingly, it is desirable to implement RID fields 26 using fast CAMs. In contrast, RID fields 56 are not part of the critical translation look-up path, but VRN fields 52 are. Since an RID is 24 bits, and a VRN is 3 bits, the present invention reduces the number of bits requiring fast CAMs by 21 bits per entry. RID fields 56 may be implemented using slow CAMs because the RID fields 56 are only searched during a TLB purge, or when region registers 44 are being updated. Both of these operations occur much less frequently than virtual-to-physical translations.

In summary, the present invention provides a method and apparatus for increasing the performance of virtual-to-physical translations by removing region registers from the look-up path during virtual-to-physical translations. Instead, regions are pre-validated by storing the VRN in the TLB entry and setting a rpV field, thereby allowing VRN and VPN fields to be searched in parallel and increasing the speed of the virtual-to-physical look-up process.

Although the present invention has been described with reference to preferred embodiments, workers skilled in the art will recognize that changes may be made in form and detail without departing from the spirit and scope of the invention.

What is claimed is:

1. In a computer system having a plurality of region registers, with each region register capable of storing a region identifier and accessed by a unique virtual region number, a translation lookaside buffer comprising:

a plurality of translation lookaside buffer entries, with each entry including:

a physical page number field for storing a physical page number;

a virtual page number field for storing a virtual page number;

a virtual region number field for storing a virtual region number; and a region pre-validated field, wherein when the region pre-validated field assumes a first state the translation lookaside buffer entry containing the region pre-validated field is pre-validated by associating an active virtual region number-to-region identifier mapping in the plurality of region registers with the translation lookaside buffer entry containing the region pre-validated field, and when the region pre-validated field assumes a second state the translation lookaside buffer entry containing the region pre-validated field de-validated by not associating the translation lookaside buffer entry containing the region pre-validated field with any region identifiers stored in the plurality of region registers.

* * * * *